United States Patent
Leung et al.

(10) Patent No.: US 8,610,902 B2
(45) Date of Patent: Dec. 17, 2013

(54) APPARATUS AND METHOD FOR INSPECTING AN OBJECT WITH INCREASED DEPTH OF FIELD

(75) Inventors: Wing Hong Leung, Hong Kong (CN); Jiangwen Deng, Hong Kong (CN); Zhuanyun Zhang, Hong Kong (CN)

(73) Assignee: ASM Technology Singapore Pte Ltd, Singapore (SG)

( * ) Notice: Subject to any disclaimer, the term of this patent is extended or adjusted under 35 U.S.C. 154(b) by 238 days.

(21) Appl. No.: 13/151,436

(22) Filed: Jun. 2, 2011

(65) Prior Publication Data

US 2012/0307259 A1    Dec. 6, 2012

(51) Int. Cl.
*G01B 11/24*    (2006.01)
(52) U.S. Cl.
USPC ............................................. 356/603
(58) Field of Classification Search
None
See application file for complete search history.

(56) References Cited

U.S. PATENT DOCUMENTS

| | | | | |
|---|---|---|---|---|
| 6,144,453 | A  * | 11/2000 | Hallerman et al. | 356/616 |
| 6,320,979 | B1 | 11/2001 | Melen | |
| 6,879,403 | B2 * | 4/2005 | Freifeld | 356/601 |
| 7,702,181 | B2 * | 4/2010 | Gouch | 382/284 |
| 2008/0204748 | A1 | 8/2008 | Nomaru et al. | |
| 2009/0277889 | A1 | 11/2009 | Kobayashi et al. | |

* cited by examiner

*Primary Examiner* — Gregory J Toatley
*Assistant Examiner* — Amanda Merlino
(74) *Attorney, Agent, or Firm* — Ostrolenk Faber LLP

(57) ABSTRACT

An apparatus for measuring a height of an object plane or multiple points on an object is disclosed. The apparatus comprises an imaging system having a focal plane passing through a focal point of the imaging system, wherein the focal plane of the imaging system is tilted at an oblique angle with respect to the object plane such that only a small portion of the object is in focus. Alternatively, the focal plane is tilted at an oblique angle with respect to a scanning direction of the imaging system during relative movement between the imaging system and the object.

20 Claims, 8 Drawing Sheets

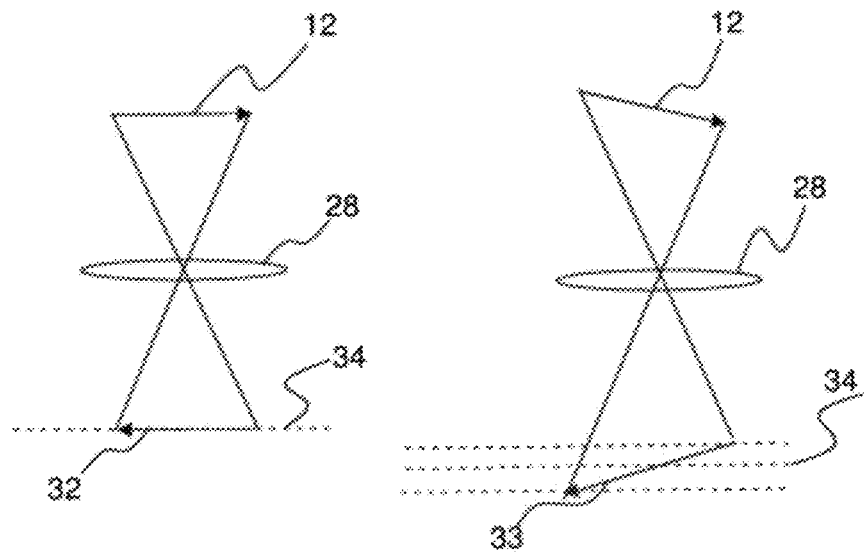
FIG. 3a  FIG. 3b
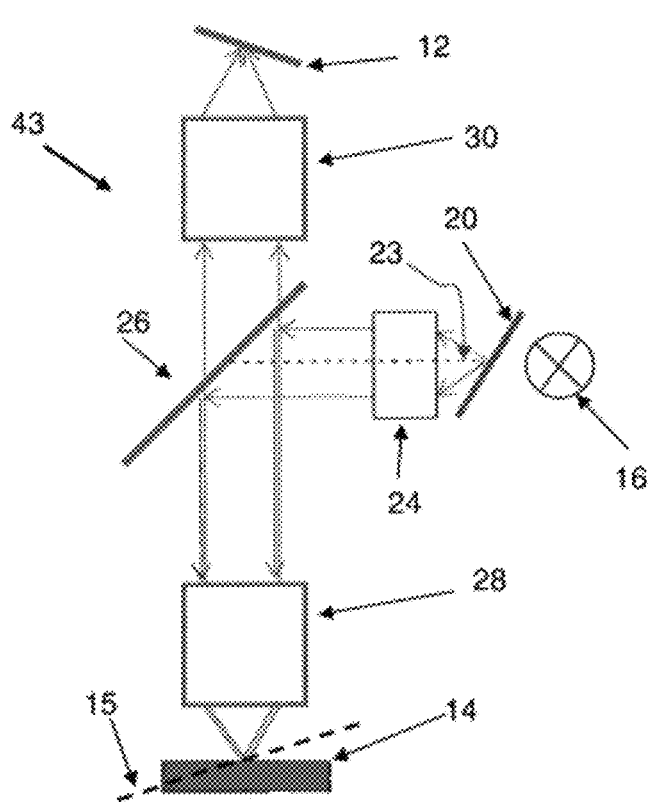
FIG. 4

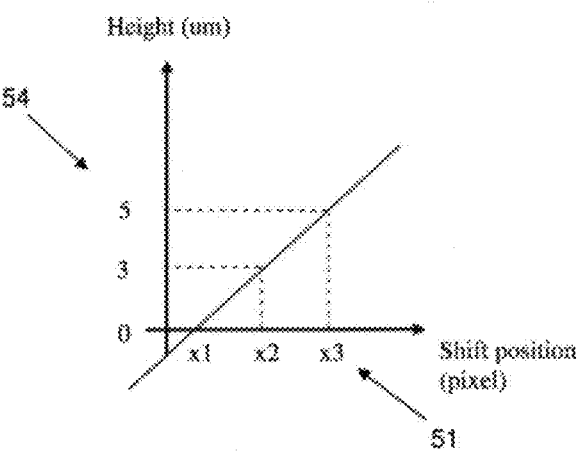
FIG. 6a
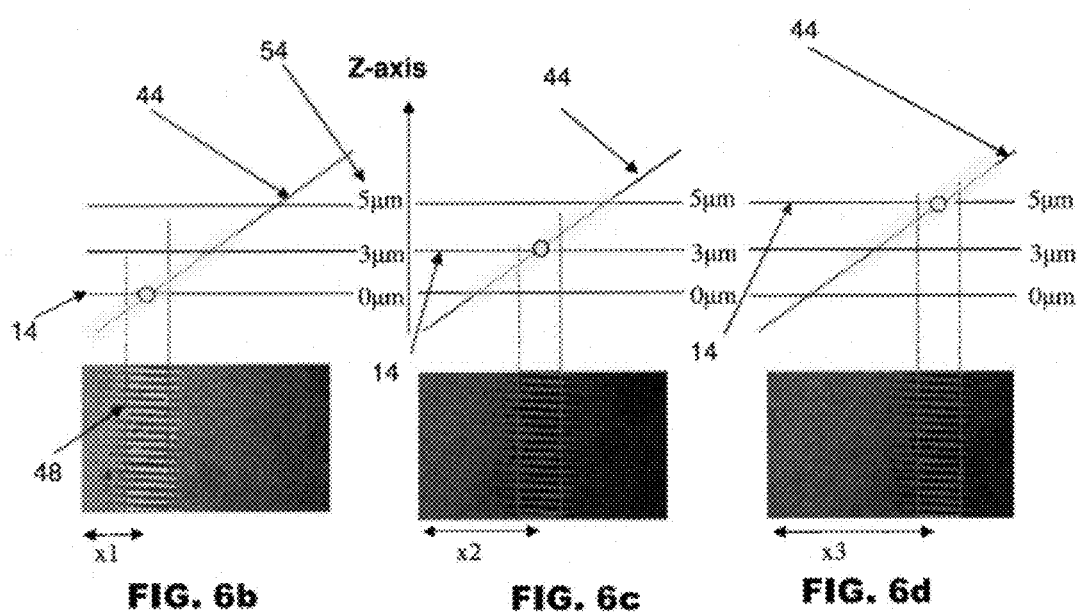
FIG. 6b  FIG. 6c  FIG. 6d

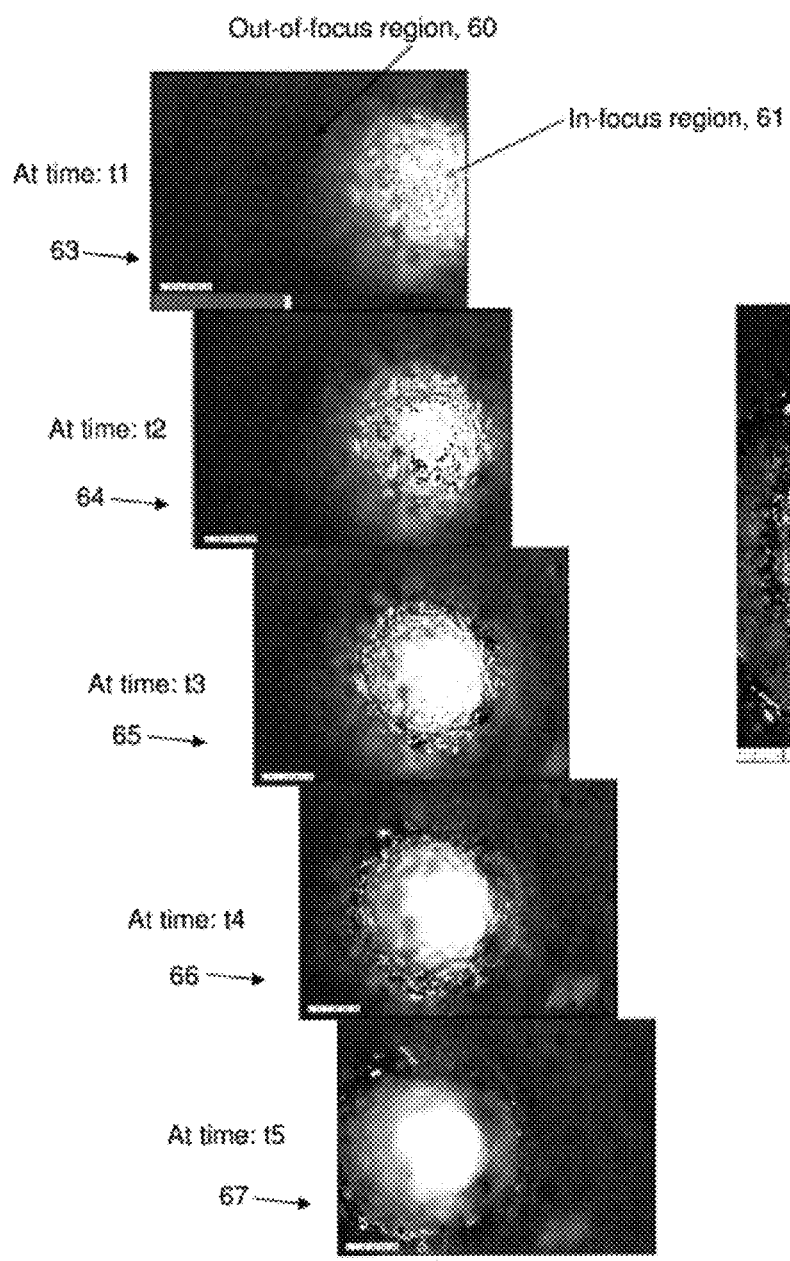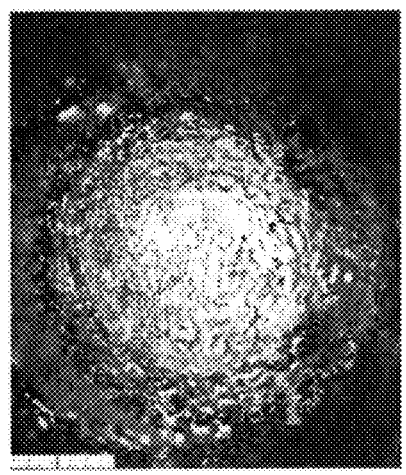
FIG. 9a
FIG. 9b

APPARATUS AND METHOD FOR INSPECTING AN OBJECT WITH INCREASED DEPTH OF FIELD

FIELD OF THE INVENTION

The invention relates to the inspection of objects such as semiconductor devices, and in particular, to the three-dimensional inspection of such objects.

BACKGROUND AND PRIOR ART

Over the past few decades, demand for semiconductor devices has grown rapidly. Semiconductor manufacturers are often pressured into improvements in end-product quality, speed and performance, as well as improvements in manufacturing process quality, speed and performance. Machine vision has proven to be a very essential part of improving the productivity and quality of semiconductor production. There is a consistent drive for faster and more accurate machine vision systems for ever-higher semiconductor yields. Correspondingly, the technical field of three-dimensional measurement and inspection for semiconductor devices, such as semiconductor wafers or substrates on final packaged products, has seen rapid growth.

A straightforward way to improve machine vision accuracy is to increase the aperture size of the lens for higher optical resolution. However, increasing aperture size will lead to decreasing Depth of Field (DOF). This approach conflicts with the trend of three-dimensional semiconductor packaging and requires very accurate placement of devices. As disclosed in U.S. Pat. No. 6,320,979 entitled "Depth of Field Enhancement", this dilemma can be solved by motorized focusing by way of a lens system that is movably attached to a camera housing, but at the cost of more complex mechanical design, vibration sensitivity and slower response time.

On-the-fly grabbing technology is becoming popular to improve machine vision speed, while the allowed exposure time is very limited to avoid blurring the grabbed image during fast scanning. Due to its limited lighting power, LED lighting may not be applicable in some applications. An on-the-fly inspection system using a Xenon strobe lamp is disclosed in US Patent Publication No. 2000/6049384 entitled, "Method and Apparatus for Three Dimensional Imaging Using Multi-phased Structured Light". However, a Xenon lamp is bulky and its lifetime is relatively short. On the other hand, LEDs present many advantages over other light sources including higher energy efficacy, longer lifetime, improved robustness, smaller size, faster switching, and greater durability and reliability. Thus, LED lighting is preferable in a machine vision system.

Moreover, many high-density semiconductor packaging inspection applications also require three-dimensional measurement capability. Interferometry is quite commonly applied for three-dimensional measurement. An interference fringe pattern results from an optical path difference between a measured object and an internal reference surface. While interferometry has high precision in the order of nanometers, it requires scanning to increase its measuring range. Hence, many measurements may be required to calculate the height of a single surface at a relatively slow speed.

In laser triangulation, a laser projects light onto an object surface and a position sensor is inclined with respect to the incident light. There is a drift in a position of the position sensor when the height varies. Height information can be measured from the drift position on the position sensor. The problem is that errors are introduced by a spot size of the laser light and any non-uniformity of the measured object.

Confocal optical devices make use of the principle that the output signal is at a peak (in intensity or contrast) at a focal plane of the confocal optical device. FIG. 1 is a conventional design of a confocal optical device 100. The confocal optical device 100 is positioned vertically over an object 102 in order to inspect the object 102. A light source 104 projects light rays 108 through a light source pinhole aperture 106. The light rays 108 are passed through a beam splitter 110 and objective lens 112 onto the object 102 which is aligned along a focal plane 120 of the confocal optical device 100. In-focus light rays 114 are transmitted from the object 102 through the objective lens 112 and beam splitter 110 and pass through a detector pinhole aperture 116. Only in-focus light rays 114 which pass through the detector pinhole aperture 116 are collected by an image sensor 118, whereas out-of-focus light rays are mostly blocked. Thus, the confocal optical device 100 is efficient at rejecting out of focus light using the detector pinhole aperture 116. A high contrast image comes from a small section of the inspected object (at the focal plane 120 of the confocal optical device 100) since it has a small depth of field.

For measuring variations in height, the confocal optical device needs to scan the whole range of possible heights by either moving the imaging system 100, or changing the height of the object 102. Therefore, the measuring speed is very slow.

Another example of a prior art approach to measuring a height of a workpiece is disclosed in US Patent Publication No. 2008/0204748 A1 entitled, "Measuring Device for Workpiece Held on Chuck Table". A measuring device is used for measuring a height of a workpiece which is held on a chuck table. A white light source emits white light while an acousto-optical device deflects the white light to separate the white light to produce a flux of diffracted light of varying wavelengths. A voltage is controlled to obtain different colors of light, and a pinhole mask passes part of the light having certain wavelengths through it. A chromatic aberration lens is configured to focus flux of different colors of light passing through the pinhole mask onto the workpiece. A photodetector is configured to detect the light reflected from the workpiece through the chromatic aberration lens. Through a map of voltage against a measured height (obtained from calibration), a height of the workpiece is determined from a value of voltage which gives rise to a peak intensity detected by the photodetector. However, the method is sensitive to color change on a surface of the measured workpiece.

Yet another example of a prior art approach is disclosed in US Patent Publication No. 2009/0277889 A1 entitled, "Laser Beam Machining Apparatus with Detection Laser Beam Oscillator". A height position of an upper surface of a workpiece held on a chuck table is detected by projecting a beam of laser light with a narrow focal range onto the workpiece. The laser light reflected from the workpiece is detected through focusing lens with a narrow depth of field. Through the ratio of focusing scores measured from two photodetectors, a height of the measured device can be obtained. A shortcoming of this approach is that it is sensitive to a contrast or texture of the surface of the workpiece.

It would be advantageous to conduct three-dimensional measurement more effectively while avoiding at least some of the aforesaid disadvantages of the prior art.

SUMMARY OF THE INVENTION

It is thus an object of the invention to seek to provide an improved method and apparatus for measuring the heights of objects at high speeds which avoid at least some of the aforesaid disadvantages of the prior art.

According to a first aspect of the invention, there is provided an apparatus for measuring a height of an object plane, comprising an imaging system having a focal plane passing through a focal point of the imaging system, wherein the focal plane of the imaging system is tilted at an oblique angle with respect to the object plane such that only a small portion of the object plane is in focus.

According to a second aspect of the invention, there is provided a method for measuring a height of an object plane, comprising the steps of: providing an imaging system having a focal plane passing through a focal point of the imaging system; arranging the focal plane such that the focal plane is tilted at an oblique angle relative to the object plane; and determining the height of the object plane with the imaging system.

According to a third aspect of the invention, there is provided an apparatus for obtaining a focused image of an object, comprising: an imaging system having a focal plane passing through a focal point of the imaging system; and a positioning device operative to move the imaging system relative to the object in a scanning direction so as to scan a surface of the object; wherein the focal plane is arranged such that the focal plane is tilted at an oblique angle relative to the scanning direction.

According to a fourth aspect of the invention, there is provided a method for obtaining a focused image of an object, comprising the steps of: providing an imaging system having a focal plane passing through a focal point of the imaging system; moving the imaging system relative to the object in a scanning direction so as to scan a surface of the object; and determining a region of interest of the object that is in focus at each respective position of the imaging system relative to the object; wherein the focal plane is arranged such that the focal plane is tilted at an oblique angle relative to the scanning direction.

It will be convenient to hereinafter describe the invention in greater detail by reference to the accompanying drawings. The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of preferred embodiments of the invention when considered with the accompanying drawings, in which:

FIGS. 3a-3b illustrate a principle of height measurement used with the imaging system according to the preferred embodiments of the invention;

FIG. 4 is an optical set-up used in an imaging system according to a second preferred embodiment of the invention wherein only its image plane and patterned grating are tilted;

FIGS. 6a-6d illustrate a calibration method utilizing a homogenous flat surface for calibrating the imaging system;

FIGS. 9a-9b are exemplary images received at different times during movement of the imaging apparatus illustrated in FIG. 8.

DETAILED DESCRIPTION OF THE PREFERRED EMBODIMENT OF THE INVENTION

Figure 1:
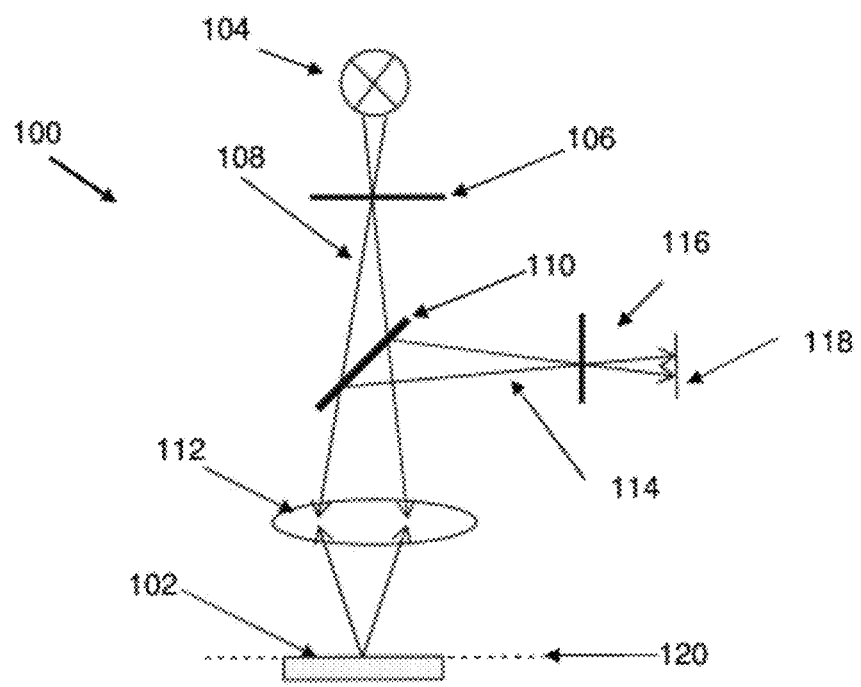
FIG. 1 is a conventional design of a confocal optical device.
Figure 2:
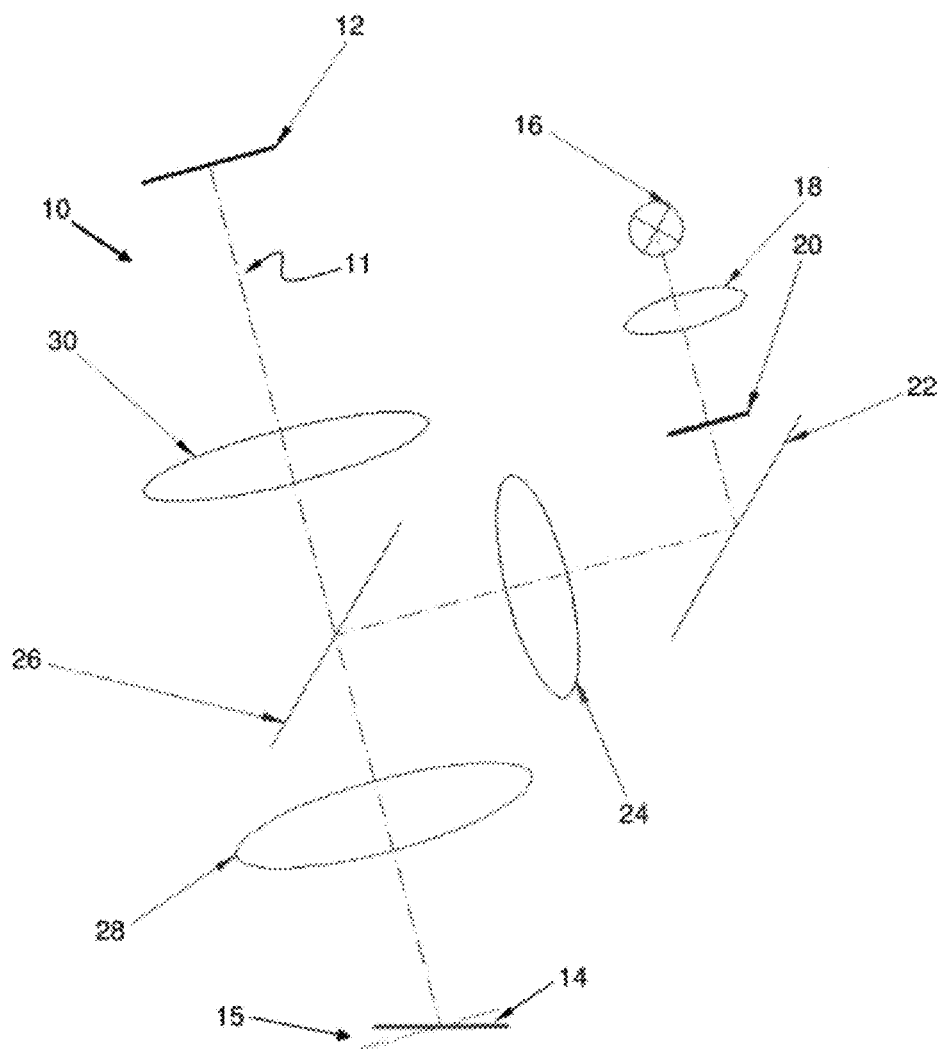
FIG. 2 is an optical set-up of an imaging system according to a first preferred embodiment of the invention.

FIG. 2 is an optical set-up of an imaging system 10 which may comprise an area array camera, such as a confocal imaging system, according to a first preferred embodiment of the invention. It is suitable for fast height measurement of a plane of an object comprising a relatively flat surface, such as a surface of a wafer. The imaging system 10 generally comprises a camera or image sensor located on an image plane 12 onto which an image received by the imaging system 10 is focused. The camera sensor has an optical axis 11 that is oblique to an object plane 14 to be measured. Accordingly, the image plane 12 is also tilted at an oblique angle relative to the object plane 14. A light source 16 projects light rays through a condenser 18 onto a patterned grating 20 having a predetermined design. The light rays which pass through the patterned grating 20 are reflected off a mirror 22 and are transmitted through a projection lens 24 before being reflected by a beam splitter 26 towards an objective lens 28.

The light rays pass through the objective lens 28 and project a sharply-focused fringe image produced from the patterned grating 20 onto a projection focal plane, which is coincident with a focal plane 15 passing through a focal point of the imaging system 10. This focal plane 15 is perpendicular to the optical axis 11 and passes through the focal point of the lens system, but is tilted at an oblique angle relative to the object plane 14. The image of the object plane 14 is transmitted upwards through the objective lens 28, the beam splitter 26 and an imaging lens 30 before being viewed by the camera sensor located on the image plane 12.

The image plane 12 of the imaging system 10 represents a flat plane which is at right angles to the optical axis 11 and onto which the imaging lens will focus an image onto the camera sensor. Again, the sharply-focused image lies on the focal plane 15 which is also perpendicular to the optical axis 11 and passes through the focal point to form a sharply-focused image on image plane 12.

FIG. 3a and FIG. 3b illustrate a principle of height measurement used with the imaging system 10 according to the preferred embodiments of the invention. In FIG. 3a, the image plane 12 is generally parallel to an object plane 34. The object plane 34 is also coincident with a focal plane 32 of the imaging system. As such, a whole of the object which lies on the focal plane 32 is sharply-focused.

On the other hand, in FIG. 3b, the image plane 12 is not parallel to the object plane 34. Since a tilted image plane will obtain different focus levels at different spatial positions, this means that individual points on a non-parallel focal plane 33 will be focused on different points in depth, with the effect that the plane of sharp focus will tilt.

The imaging system may thus have a tilted focal plane 33 relative to the object plane 34. The spatial focus position is dependent on the height position of the object plane 34 at the intersection of the focal plane 33 and the object plane 34. Hence, object planes at multiple height levels intersect the focal plane 33 at multiple spatial points corresponding to the various height levels of the object planes, such that only a narrow region of the object plane 34 where the focal plane 33 intersects it is in focus on the image plane. Accordingly, only a small or narrow region of the object plane 34 of a planar object is in focus The effect is that the focal plane 33 where a plane of sharp focus is obtainable will tilt. The camera sensor located on the image plane 12 that is tilted relative to the object plane 34 will obtain different focus levels at different spatial positions. This means that individual points on the object plane 34 will be sharply-focused only at certain different points in depth, such that the depth or height is determinable.

FIG. 4 is an optical set-up used in an imaging system 43 according to a second preferred embodiment of the invention wherein only its image plane 12 and patterned grating 20 are tilted. A light source 16 projects light rays onto the patterned grating 20 which has a normal vector that is tilted at an oblique angle relative to the optical axis 23 of a projection lens 24 that is operative to project a fringe image from the patterned grating 20 towards the object plane 14. The light rays are transmitted through the projection lens 24 before being reflected by a beam splitter 26 towards the objective lens 28. The light rays pass through the objective lens 28 and project a sharply-focused fringe image produced from the patterned grating 20 onto the focal plane 15. This focal plane 15 is slanted relative to the object plane 14. Then, the image of the object plane 14 is transmitted upwards through the objective lens 28, the beam splitter 26 and an imaging lens 30 before being viewed by the camera sensor located on the tilted image plane 12.

In this set-up, the object plane 14 and the centers of the objective lens 28 and imaging lens 30 are all aligned along a vertical axis. However, the image plane 12, which is located at a focal length f from the imaging lens 30, has a normal vector that is oblique to the vertical axis. Similarly the patterned grating 20 has a normal vector that is also oblique to the optical axis 23 of the projection lens 24. Thus, this set-up may obtain the same effect as the other preferred embodiments of the invention. The object plane 14 is not parallel to the image plane 12, and the sharply-focused projection focal plane of the projected fringe image is coincident with the tilted focal plane 15 of the imaging system 43. The result is that only a narrow region of the object plane 14 is in focus on the image plane 12.

Figure 5A:
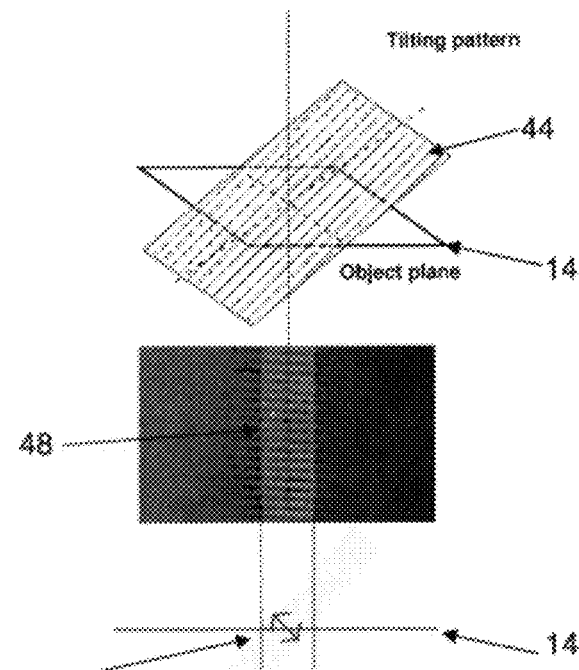
FIGS. 5a-5b illustrate the projection of a tilted fringe image according to a height measurement approach according to the preferred embodiments of the invention.
Figure 5B:
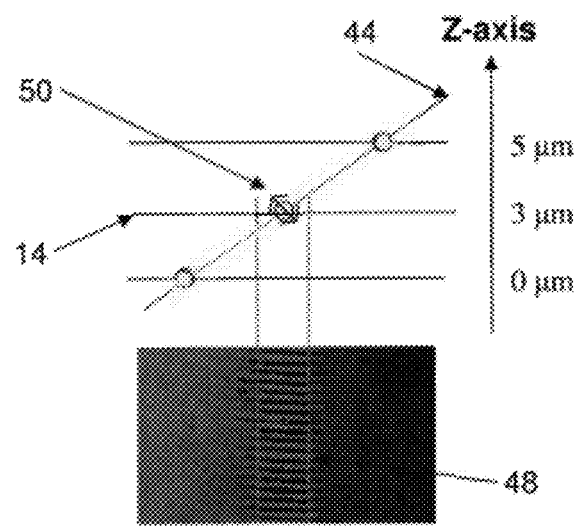

FIGS. 5a-5b illustrate the projection of a tilted fringe image according to a height measurement approach according to the preferred embodiments of the invention. In FIG. 4, the light source 16 projects light rays through the patterned grating 20 and objective lens 28 onto an object surface to be measured. In FIG. 5a, the projection focal plane 44 of the projected fringe image is arranged obliquely to and intersects the object plane 14. A narrow region of a fine projected fringe image 48 is illustrated as a series of regularly-spaced lines, such that the expected fringe image received by the image plane 12 should also be regularly-spaced if the focal plane of the imaging system is coincident with the projection focal plane 44 of the projected fringe image.

FIG. 5b is a graph showing how a height of the object plane is determinable from a position of its depth of field 50. It demonstrates that a horizontal position of the projected fringe image is sharply-focused within the depth of field 50 and is viewed in the sharply-focused region 48 on the image plane 12. The object height can be calculated from the pixel position of the sharply-focused region 48 once the apparatus has been calibrated.

FIGS. 6a-6d illustrate a calibration method utilizing a homogenous flat surface for calibrating the imaging system 10 of FIG. 2 or the imaging system 43 of FIG. 4. The imaging system is calibrated by using a homogenous flat surface with a fringe image projected onto it. As shown in FIG. 6a, each shift in a pixel position of a fine-focus horizontal position 51 located on an in-focus point of the fringe image 48 is related to a certain height 54 at that point, such that the shift in pixel position of a point on the fringe image 48 on the homogenous flat surface that is viewed on the image plane that is in fine focus has a linear relationship with a height of the homogenous flat surface.

In FIGS. 6b-d, it is necessary to find a fine-focus horizontal position 51 of the fringe image 48. This horizontal position 51 is correlated to a height 54 of the flat surface at an object plane 14. Calibration of a relationship between a shift in pixel position 51 against a known height 54 of the flat surface is performed. Preferably, the said shift in pixel position is measured corresponding to each 1 μm depth step change, so that a graph of the fine-focus horizontal position 51 shift against depth is obtained. Thereafter, the height of a relative flat workpiece (which may be a relatively flat wafer) can be measured from the shift in pixel position of the in-focus part of the projected image 48 which is obtainable in a single image.

Figure 7:
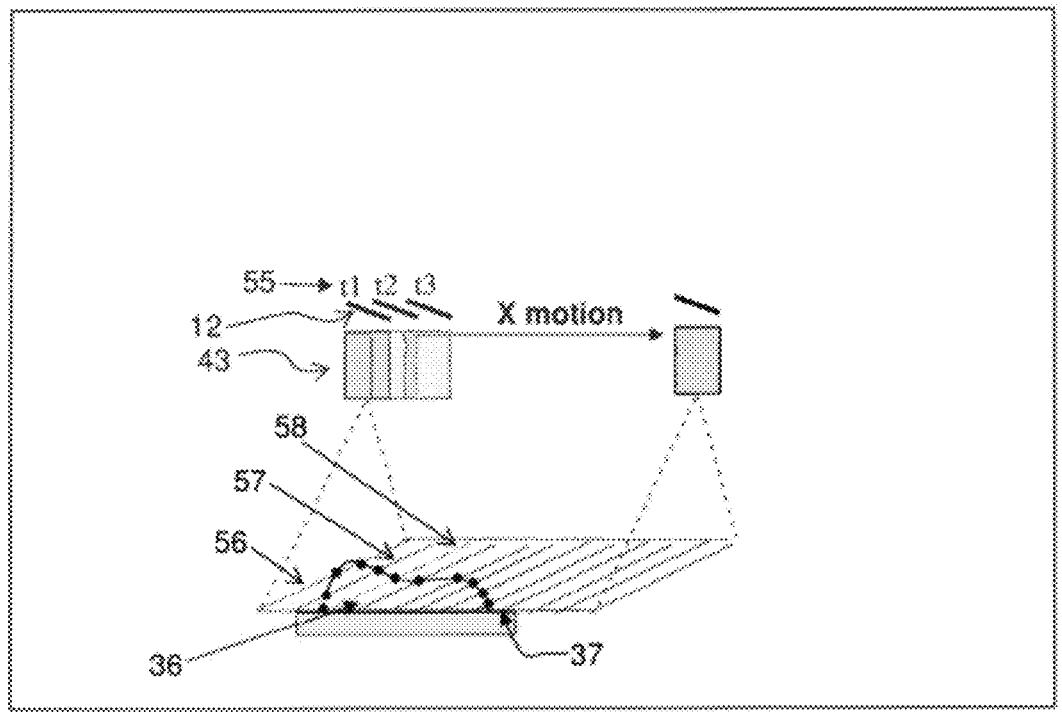
FIG. 7 illustrates a movable imaging system for the three-dimensional measurement of objects having non-flat surfaces.

FIG. 7 illustrates a movable imaging system for the three-dimensional measurement of objects having non-flat surfaces. In this example, an object 36 is placed on a reference plane 37 and the image plane 12 of the imaging system is tilted relative to the reference plane 37 on which the object 36 is placed so that the image plane 12 of the imaging system is not parallel to the reference plane 37 on which the object 36 is placed. The imaging system thus has a tilted focal plane 56 relative to the reference plane 37 on which the object 36 is placed. Then, the imaging system is moved relative to the object 36 by a driving mechanism along a scanning direction (which is illustrated as the X direction in FIG. 7) across the reference plane 37 and projects a moving fringe image onto the object 36. At different positions 55, the focal plane 56, 57, 58 of the imaging system will move parallel to the imaging system and will be at different positions at different times, t1, t2 and t3 respectively. Accordingly, the focal plane 56, 57, 58 of the imaging system 43 is arranged at an oblique angle to the scanning direction or X direction during such motion. In this manner, respective heights of multiple points on the object 36 are measured when the said points lie on the moving focal plane.

Figure 8:
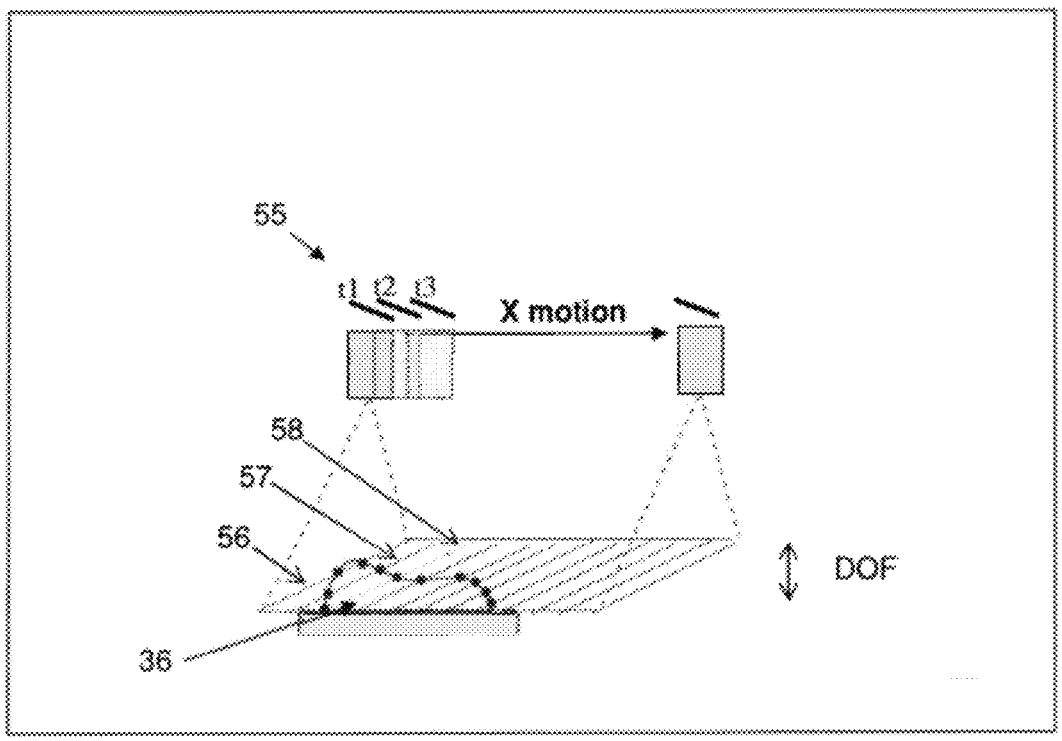
FIG. 8 illustrates an imaging system which has increased optical resolution while maintaining an effective depth of field.

By using the same platform and without projecting a fringe image, FIG. 8 illustrates an imaging system which increases optical resolution while maintaining an effective depth of field. The optical system is configured at a high optical resolution, which means there is a small DOF for each captured image. As the optical system is moved along the X direction, an extended depth of field can be obtained from combining the in-focus regions of a series of images and constructing a complete focused image of the whole object comprising different depths which is constituted by a combination of the separate captured images. If the object 36 in FIG. 8 has enough features for forming sharply-focused regions, its height profile can also be thereby determined.

As an example, FIG. 9a shows images 63, 64, 65, 66, 67 received at the image plane 12 at different times t1, t2, t3, t4 and t5 respectively. The sharply-focused region 61 on the image plane 12 is at the region where the profile of the object intersects with the system's focal plane 56, 57, 58 at that instance of time, whereas out-of-focus regions 60 are not. Hence, the height of each sharply-focused region 61 is determinable from the principles set out above.

The surface height profile of the object can be constructed from a series of images by determining an in-focus region 61 at different times as the imaging system is moved along the scanning direction or X direction. In addition, an image with an extended depth of field (see FIG. 9*b*) can be constructed by using a processing technique called focus stacking. Focus stacking is an image processing technique which combines a sequence of images with different focus levels to provide a complete focused image 9*b* with a larger depth of field than individual single source images or partially focused images. Thus, the advantage of this three-dimensional measurement setup of moving the image system along the X direction means no vertical motion is necessary and a larger field-of-view (FOV) as well as depth-of-field (DOF) with a higher imaging resolution can be obtained at a faster speed.

Figure 10:
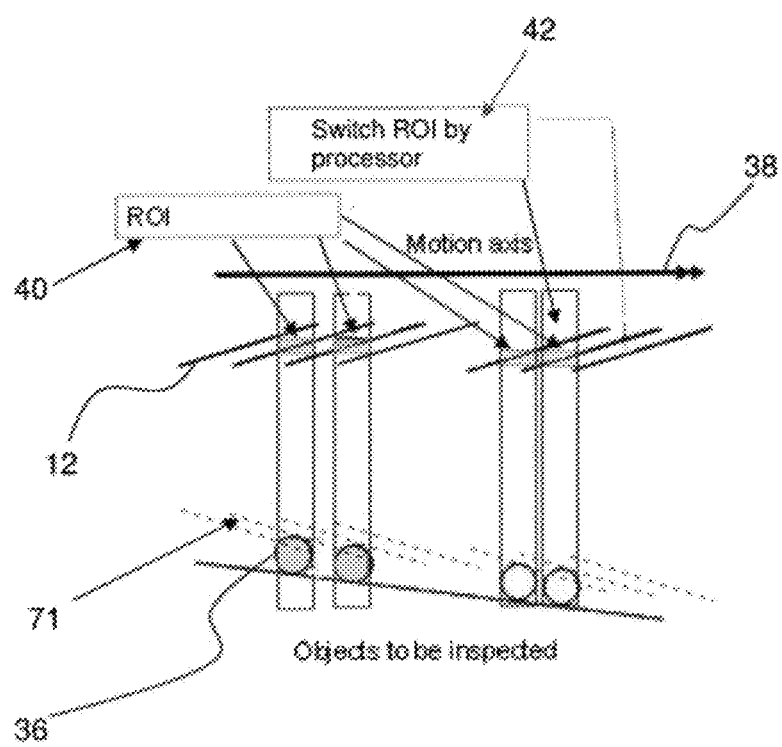
FIG. 10 illustrates how a complex motorized focusing system may be replaced by an imaging system using the principles of the preferred embodiment of the invention.

FIG. 10 illustrates how a complex motorized focusing system may be replaced by an imaging system using the principles of the preferred embodiment of the invention. This setup is similar to the set-up in FIG. 8, and is usable for fast electronic focusing. The imaging system is moved relative to objects 36 to be inspected in a scanning direction along a motion axis 38 in the X direction. The objects 36 are placed on a reference plane and a focal plane 71 of the imaging system is tilted relative to the scanning direction or X direction in which the imaging system is moved relative to the objects 36 for scanning the objects 36.

A processor of the imaging system automatically identifies and stores an image of a narrow area of fine focus on the objects 36 viewed by the image sensor which lies on or intersects with the focal plane 71 of the imaging system. If the object height is determinable by the above confocal or focusing approach or in some other way, such a region of interest ("ROI") 40 comprising the narrow area of fine focus is identified by the processor associated with the imaging system depending on an area of the image that is in fine focus. As the imaging system moves relative to the objects 36, thereby moving its focal plane 71, the ROI 40 may be switched by the processor 42 to other areas that are in fine focus assuming that the heights of the objects 36 at various points can be effectively and quickly measured. Accordingly, this system setup may act as an electronic motorized focusing system which may switch to fine focusing of a region of interest (ROI) of an individual inspection image through the processor. Thereafter, a fine-focus image comprising height variations that are otherwise out of an optical depth of field of the imaging system at respective positions of the imaging system can be obtained by combining the fine ROI of a series of images to achieve an extended depth of field.

It should be appreciated that the speed of height measurement using the apparatus and methods according to the preferred embodiments of the invention is faster than conventional motorized approaches. Height measurement can in fact be conducted in a single image as explained above if the height of a flat surface is to be measured. The accuracy of measurement is also not sensitive to contrast, texture and color change of surface of the measured material, which is a problem that is faced by some of the aforesaid prior art approaches. Moreover, the principles according to the preferred embodiment of the invention may act as a fast and highly accurate vision platform to replace motorized focusing where larger FOV and DOF with high imaging resolution are required.

The invention described herein is susceptible to variations, modifications and/or addition other than those specifically described and it is to be understood that the invention includes all such variations, modifications and/or additions which fall within the spirit and scope of the above description.

The invention claimed is:

1. Apparatus for measuring a height of an object plane, the apparatus comprising an imaging system having an optical axis and a focal plane passing through a focal point of the imaging system, wherein the imaging system further comprises an image sensor arranged on an image plane onto which an image received by the image sensor is focused, such that the optical axis of the imaging system is arranged at a right angle with respect to the image plane, and the focal plane of the imaging system is tilted at an oblique angle with respect to the object plane such that only a small portion of the object plane is in focus.

2. Apparatus as claimed in claim 1, wherein the imaging system further comprises a grating and a light source operative to project light rays through the grating, for projecting a fringe image onto the object plane such that only a narrow region of the fringe image is in focus on the object plane.

3. Apparatus as claimed in claim 2, wherein the fringe image is focused onto a projection focal plane that is oblique to the object plane, and the projection focal plane intersects the object plane at the narrow region of the fringe image that is in focus on the object plane.

4. Apparatus as claimed in claim 2, wherein the grating has a normal vector that is tilted at an oblique angle relative to an optical axis of a projection lens next to the grating, the projection lens being operative to project the fringe image from the grating towards the object plane.

5. Apparatus as claimed in claim 4, wherein a center of an objective lens for focusing the fringe image onto the object plane and a center of an imaging lens for focusing a reflection of the fringe image onto an image plane of the imaging system are aligned along an axis that is perpendicular to the object plane.

6. Apparatus as claimed in claim 2, wherein the imaging system and the object plane are configured such that an extent of a shift in a pixel position of a point on the fringe image on the object plane that is in focus has a linear relationship with the height of the object plane.

7. Apparatus for measuring respective heights of multiple points on an object, the apparatus comprising:
    an imaging system having an optical axis and a focal plane passing through a focal point of the imaging system; and
    a driving mechanism that is operative to drive the imaging system to move relative to the object in a scanning direction while projecting a fringe image onto the object so as to scan a surface of the object;
    wherein the imaging system further comprises an image sensor arranged on an image plane onto which an image received by the image sensor is focused, such that the optical axis of the imaging system is arranged at a right angle with respect to the image plane, and the focal plane is tilted at an oblique angle relative to the scanning direction.

8. Method for measuring a height of an object plane, the method comprising the steps of:
    providing an imaging system having an optical axis and a focal plane passing through a focal point of the imaging system;
    arranging an image sensor of the imaging system on an image plane onto which an image received by the image sensor is focused, such that the optical axis of the imaging system is arranged at a right angle with respect to the image plane, and arranging the focal plane such that the focal plane is tilted at an oblique angle relative to the object plane; and
    determining the height of the object plane with the imaging system.

9. Method as claimed in claim 8, wherein the step of determining the height of the object plane further comprises the step of projecting light rays from a light source comprised in the imaging system through a grating to project a fringe image onto the object plane such that only a narrow region of the fringe image is in focus on the object plane.

10. Method as claimed in claim 9, wherein the fringe image is focused onto a projection focal plane that is oblique to the object plane, and the projection focal plane intersects the object plane at the narrow region of the fringe image that is in focus on the object plane.

11. Method as claimed in claim 9, wherein the grating has a normal vector that is tilted at an oblique angle relative to an optical axis of a projection lens next to the grating, the projection lens being operative to project the fringe image towards the object plane.

12. Method as claimed in claim 9, wherein the step of determining the height of the object plane comprises the step of determining a shift in a pixel position of a point on the fringe image that is in focus as compared to a calibrated pixel position of the point, wherein an extent of the shift in pixel position has a linear relationship with the height of the object plane.

13. Method of measuring respective heights of multiple points on an object, comprising the steps of:
    providing an imaging system having an optical axis and a focal plane passing through a focal point of the imaging system;
    arranging an image sensor of the imaging system on an image plane onto which an image received by the image sensor is focused, such that the optical axis of the imaging system is arranged at a right angle with respect to the image plane, and arranging the focal plane such that the focal plane is tilted at an oblique angle relative to a scanning direction;
    moving the imaging system relative to the object in the scanning direction to project a moving fringe image onto the object and to scan a surface of the object; and
    determining the heights of the multiple points on the object with the imaging system.

14. Apparatus for obtaining a focused image of an object, the apparatus comprising:
    an imaging system having an optical axis and a focal plane passing through a focal point of the imaging system; and
    a positioning device operative to move the imaging system relative to the object in a scanning direction so as to scan a surface of the object;
    wherein the imaging system further comprises an image sensor arranged on an image plane onto which an image received by the image sensor is focused, such that the optical axis of the imaging system is arranged at a right angle with respect to the image plane, and the focal plane is arranged such that the focal plane is tilted at an oblique angle relative to the scanning direction.

15. Apparatus as claimed in claim 14, further comprising a processor that is operative to identify and store an image of a region of interest of the object that is in fine focus at each respective position of the imaging system relative to the object.

16. Apparatus as claimed in claim 15, wherein the processor is configured and operative to combine separate images of regions of interest at the respective positions of the imaging system relative to the object, and to construct a focused image of the object comprising height variations that are out of an optical depth of field of the imaging system at the respective positions of the imaging system, which is constituted by a combination of the separate images of the regions of interest.

17. Method of obtaining a focused image of an object, the method comprising the steps of:
    providing an imaging system having an optical axis and a focal plane passing through a focal point of the imaging system;
    moving the imaging system relative to the Object in a scanning direction so as to scan a surface of the object; and
    determining a region of interest of the object that is in focus at each respective position of the imaging system relative to the object;
    wherein the imaging system further comprises an image sensor arranged on an image plane onto which an image received by the image sensor is focused, such that the optical axis of the imaging system is arranged at a right angle with respect to the image plane, and the focal plane is arranged such that the focal plane is tilted at an oblique angle relative to the scanning direction.

18. Method as claimed in claim 17, further comprising the step of identifying and storing an image of a region of interest of the object that is in fine focus at each respective position of the imaging system relative to the object.

19. Method as claimed in claim 18, further comprising the step of combining separate images of regions of interest at the respective positions of the imaging system relative to the object, and constructing a focused image of the object comprising height variations that are out of an optical depth of field of the imaging system at the respective positions of the imaging system, which is constituted by a combination of the separate images of the regions of interest.

20. Method as claimed in claim 17, further comprising the step of measuring a height of one or more points on the object based upon the region of interest of the object that is in focus.

* * * * *